United States Patent
Ju

(10) Patent No.: US 7,620,425 B2
(45) Date of Patent: Nov. 17, 2009

(54) MOBILE TERMINAL HAVING A PLURALITY OF DISPLAYS

(75) Inventor: Jung Yeoul Ju, Seoul (KR)

(73) Assignee: LG Electronics Inc., Seoul (KP)

( * ) Notice: Subject to any disclaimer, the term of this patent is extended or adjusted under 35 U.S.C. 154(b) by 276 days.

(21) Appl. No.: 11/530,231

(22) Filed: Sep. 8, 2006

(65) Prior Publication Data

US 2007/0076861 A1   Apr. 5, 2007

(30) Foreign Application Priority Data

Sep. 30, 2005   (KR) ...................... 10-2005-0092630

(51) Int. Cl.
  *H04M 1/00*   (2006.01)
(52) U.S. Cl. ................ 455/566; D14/306; D14/371; 455/575.4
(58) Field of Classification Search ............. 455/566, 455/575, 575.4; 361/681; D14/306
  See application file for complete search history.

(56) References Cited

U.S. PATENT DOCUMENTS 6,643,124 B1 *   11/2003   Wilk ........................ 361/681
6,931,265 B2 *   8/2005   Reyes et al. ............... 455/566
7,363,066 B2 *   4/2008   Im et al. .................. 455/575.4
2004/0198477 A1 *   10/2004   Jung et al. .............. 455/575.4
2005/0119034 A1 *   6/2005   Kato et al. .............. 455/575.4

FOREIGN PATENT DOCUMENTS

| JP | 2003-298700 A | 10/2003 |
| KR | 10-2004-0107051 | 12/2004 |
| KR | 10-0523893 | 12/2004 |
| KR | 1020040107051 | * 12/2004 |
| KR | 10-2005-0028078 | 3/2005 |
| KR | 10-2005-0070221 | 7/2005 |

OTHER PUBLICATIONS

Applicant Submitted Prior Art.*
User's Guild for Nokia 6260—http://nds1.nokia.com/phones/files/guides/Nokia_6260_UG_en.pdf.*
English Language Abstract of JP 10-2004-0107051.
English language Abstract of Korean 10-2005-0028078.
English language Abstract of JP 2003-298700 A.

* cited by examiner

*Primary Examiner*—Nick Corsaro
*Assistant Examiner*—Quan M Hua
(74) *Attorney, Agent, or Firm*—Birch, Stewart, Kolasch & Birch, LLP

(57) ABSTRACT

A mobile terminal includes a first body, a second body including a first display, and a second display which becomes exposed when it slidably moves with respect to one of the first body and the second body.

2 Claims, 9 Drawing Sheets

MOBILE TERMINAL HAVING A PLURALITY OF DISPLAYS

The present application claims priority from Korean Patent Application No. 10-2005-0092630, filed Sep. 30, 2005, the entire contents of which is incorporated herein by reference.

BACKGROUND

1. Field of the Invention

The present invention relates to a mobile terminal having a plurality of displays.

2. Description of the Related Art

Generally, most conventional mobile terminals can be classified as a flip-type mobile terminal, a folder-type mobile terminal or a sliding-type mobile terminal, based on their shape and manner of operation.

A conventional flip-type mobile terminal typically includes a main body having input buttons and a display, and a cover body which covers the main body and which flips open to expose the display. In a conventional folder-type mobile terminal, a display is typically built into the cover body, rather than the main body, and rotates about a hinge. In a conventional sliding-type mobile terminal, the display is typically built into the cover body, but the cover body slides, rather than rotates, open to expose the main body.

Some conventional folder-type mobile terminals have a clamshell-type structure, and include a secondary outer display formed on an outer surface of the cover body, in addition to a main display formed on an inner surface of the cover body. However, since the displays are formed on opposite sides of the cover body, both of them cannot be viewed simultaneously.

For example, suppose a user is viewing a Digital Multimedia Broadcasting (DMB) service on a display of a conventional mobile terminal. If the user wishes to perform a video call, transmit data such as a picture or photograph, or send or receive a text message, the user would have to stop using the DMB service to perform this other function.

SUMMARY OF THE INVENTION

One of the features of the present invention is a mobile terminal having a plurality of displays which can be viewed simultaneously.

To achieve at least this feature, there is provided a mobile terminal which includes a first body, a second body including a first display, and a second display which becomes exposed when it slidably moves with respect to one of the first body and the second body.

The mobile terminal may include a first sliding body slidably mounted to one of the first body and the second body and including the second display. The mobile terminal may also include a second sliding body slidably mounted to the first sliding body. The mobile terminal may include a track, fixed to one of the first body and the first sliding body, and a groove, fixed to the other of the first body and the first sliding body, and the track may slide within the groove. The track may have a dove tail structure.

The mobile terminal may include at least one elastic member which urges the first sliding body towards an open position and towards a closed position with respect to the first body. The second body may be coupled to the first sliding body with a hinge module. The mobile terminal may include an input device, provided on the first body. The input device may include at least one of a key and a touch screen.

The first display and the second display may be arranged to be simultaneously visible to a user. The mobile terminal may include a wireless transceiver which receives wireless signals, and an image processor which processes image signals included in the wireless signals for display on at least one of the first display and the second display. The mobile terminal may divide an image into sub-images, and display the sub-images on the first and second displays in such a manner as to display a composite image.

Different images may be displayed on the first display and the second display. The first display and the second display may include one of a liquid crystal display (LCD) and an organic light emitting diode (OLED). A surface of at least one of the first body and the second body may include a touch screen. The mobile terminal may divide an image into sub-images, and display the sub-images on the first and second displays and the touch screen in such a manner as to display a composite image. The second body may rotates about two axes.

There is also provided a mobile terminal which includes a main body, a first cover body including a first display which rotates with respect to the main body, and a sliding body including a second display which slides with respect to the main body.

The first and second displays may be simultaneously visible to a user. The mobile terminal may also include a second cover body including a third display which slides with respect to the first cover body.

Other exemplary embodiments and features of the present invention may be ascertained by reviewing the present disclosure and the accompanying drawings.

BRIEF DESCRIPTION OF THE DRAWINGS

The present invention is further described in the detailed description which follows, with reference to the following noted drawings which illustrate non-limiting examples of embodiments of the present invention, and in which like reference numerals represent similar parts throughout the drawings.

DETAILED DESCRIPTION OF THE EMBODIMENTS

Hereinafter, exemplary embodiments of the present invention will be described in detail with reference to the attached drawings.

Figure 1:
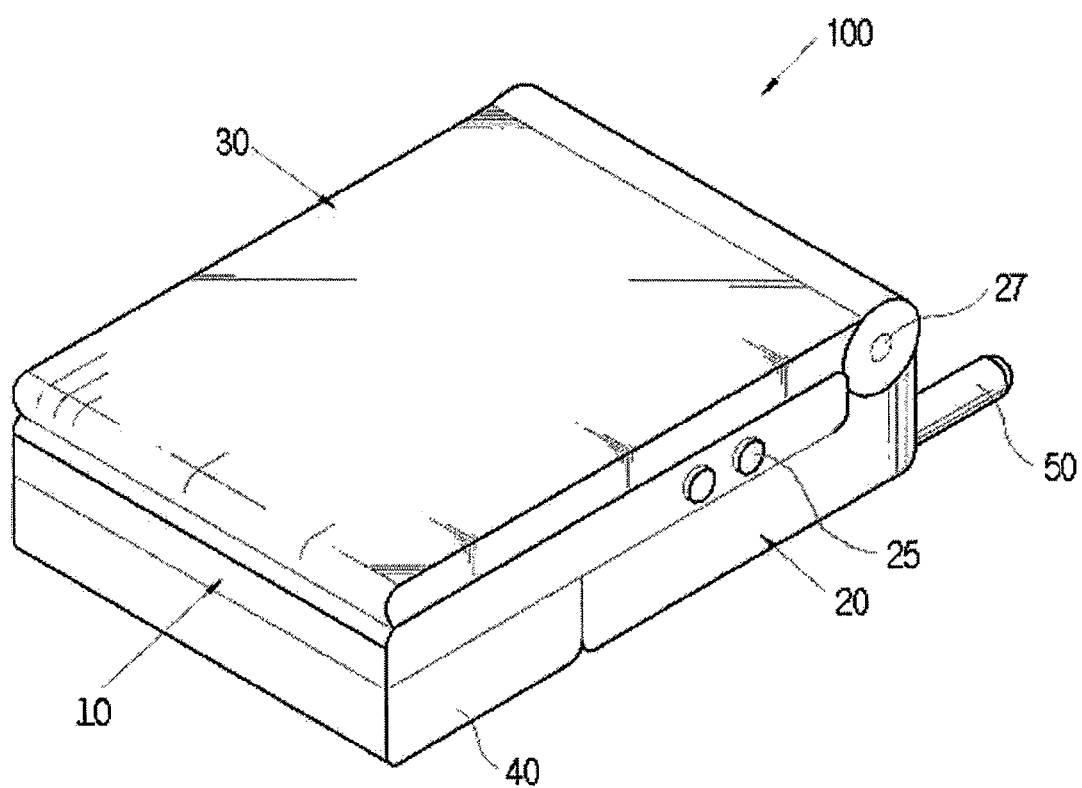
FIG. 1 is a perspective view of a mobile terminal according to an embodiment of the present invention.

FIG. 1 is a perspective view of a mobile terminal according to an embodiment of the present invention. The mobile terminal 100 shown in FIG. 1 includes a main body 10, a slider 20, a cover 30, a battery pack 40 engaged with the main body 10 and an antenna 50.

Various kinds of circuit components, which may be provided on a printed circuit board (PCB), are mounted inside the main body 10 to operate the mobile terminal 100.

In one embodiment, at least one side button 25 may be provided on a side of the main body 10, as shown in FIG. 1. The side buttons 25 may perform functions such as, but not limited to, controlling a speaker volume or key tone.

The battery pack 40 shown in FIG. 1 is removable and is provided on a lower part of the main body 10 in such a manner as to allow space for the slider 20. The battery pack 40 may be rechargeable, and may include, for example, a lead-acid battery, a Ni—Cd battery, a Ni-MH battery, a lithium-ion battery, a lithium-polymer battery, or the like.

The slider 20 shown in FIG. 1 is slidably mounted to the lower part of the main body 10, and slides with respect to the main body 10.

The cover 30 shown in FIG. 1 is coupled to the slider 20 with a hinge module 27. Via the hinge module 27, the cover 30 rotates with respect to the main body 10 to cover and expose the main body 10. In some non-limiting embodiments, a user may open the cover 30 with his fingers. In other embodiments, the cover 30 may be opened by an automated mechanism, such as, but not limited to, a spring mechanism.

The antenna 50 allows the mobile terminal 100 to transmit and receive wireless communication signals. The antenna 50 is not limited, of course, to an external antenna as depicted in FIG. 1, but may alternatively be provided internal to the mobile terminal 100.

Figure 2:
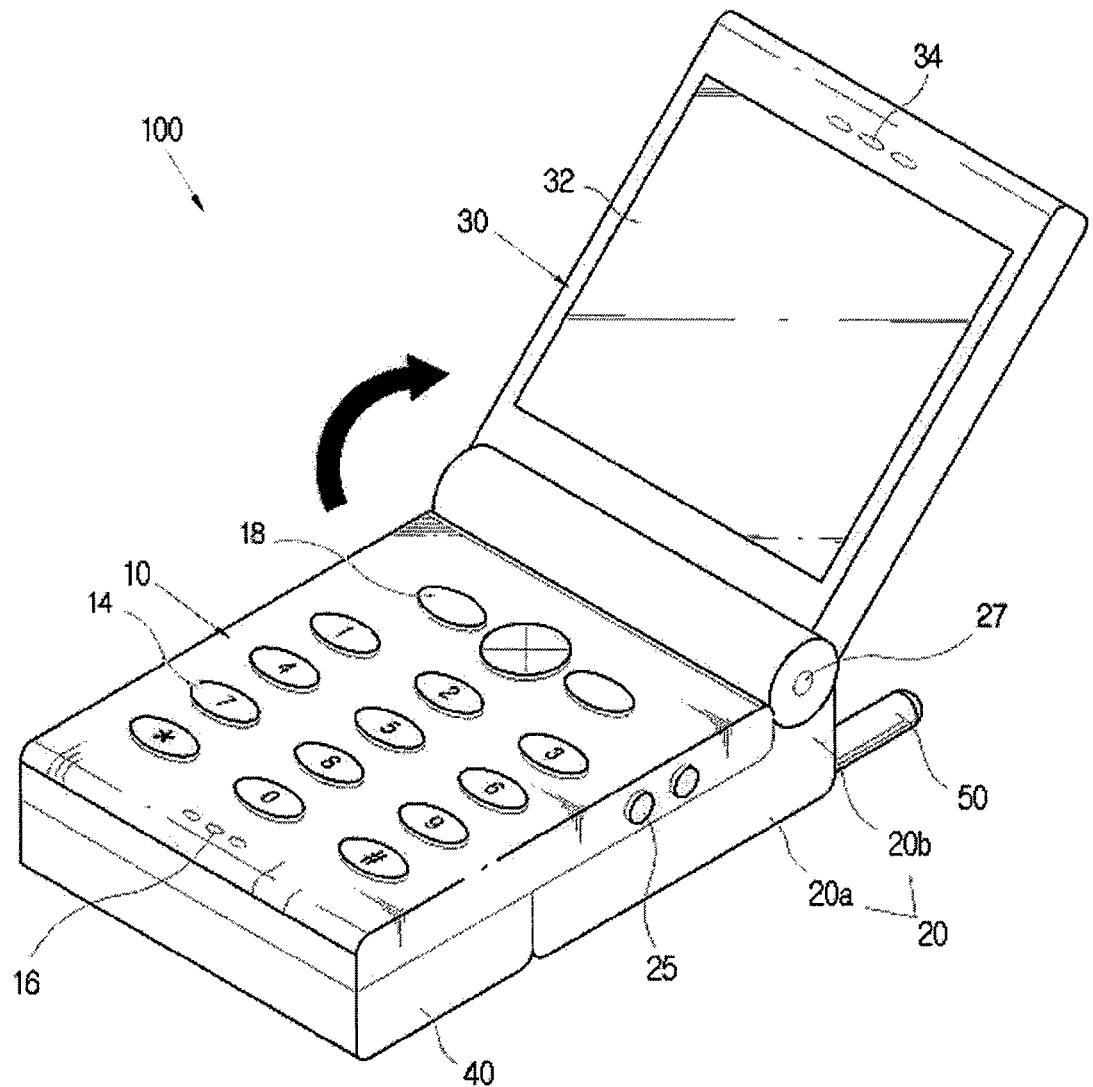
FIG. 2 is a perspective view of the mobile terminal of FIG. 1 when a cover is in an open position.

FIG. 2 is a perspective view of the mobile terminal 100 of FIG. 1 when the cover 30 is in an open position.

An inner surface of the main body 10 shown in FIG. 2 includes a plurality of input buttons 14 which allow a user to perform a variety of input operations, such as, but not limited to, entering a phone number or a text message, or entering a command. The input buttons may correspond, for example, to alphanumeric characters and predetermined functions. Of course, the user interface of the mobile terminal 100 is not limited to input buttons as shown in FIG. 2. For example, a touch-screen display (such as, for example, one which recognizes handwriting), or other type of user interface may be used instead.

In some embodiments, at least one menu navigation button 18 may be provided on the inner surface of the main body 10, as shown in FIG. 2, for allowing a user to navigate through a menu in the mobile terminal 100. The mobile terminal 100 may also include a microphone 16 that captures a person's voice (for use, for example in performing a voice call or recording a voice message). The microphone 16 may be provided, for example, at a lower part of the inner surface of the main body 10, as shown in FIG. 2.

The slider 20 includes a horizontal part 20a which slides along the main body 10, and may also include a vertical part 20b, provided at an end of the main body 10, as shown FIG. 2.

A main display 32 is formed on an inner surface of the folder 30. A speaker 34 may also be provided in the mobile terminal 100, above the main display 32, for example. The speaker 34 may have various uses, such as, but not limited to, outputting a voice signal.

The main display 32 may be, for example, a liquid crystal display (LCD), an organic light emitting diode (OLED) display, a touch screen display, or the like. The main display 32 may have a variety of uses. For example, the main display 32 can be used in conjunction with performing a telephone call, sending a text or email message, viewing a photograph or motion picture, performing an MP3 function, utilizing a DMB service, and/or playing a game.

Figure 3:
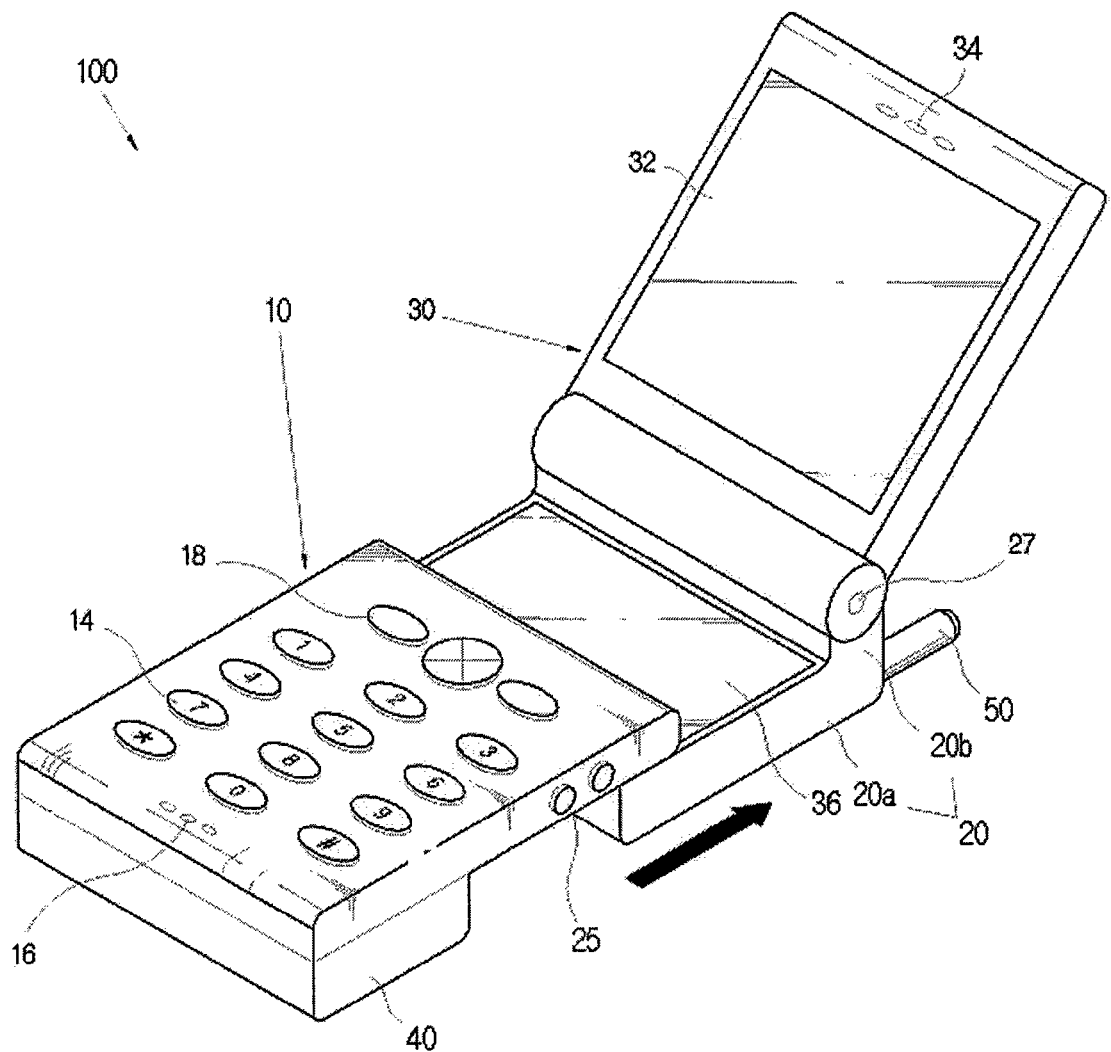
FIG. 3 is a perspective view of the mobile terminal of FIG. 1 when a slider is slid open with respect to a main body.

FIG. 3 is a perspective view of the mobile terminal 100 of FIG. 1 when the slider 20 is slid open with respect to the main body 10.

As shown in FIG. 3, when the slider 20 is slid open with respect to the main body 10, an auxiliary display 36, formed on an inner surface of the slider 20, is exposed.

The auxiliary display 36 may be, for example, a liquid crystal display (LCD), an organic light emitting diode (OLED) display, a touch screen display, or the like.

The auxiliary display 36 shown in FIG. 3 is smaller than the main display 32. The auxiliary display 36 may display a variety of information, such as, but not limited to, the strength of a signal received from a base station, the state of a battery charge, whether the mobile terminal 100 is set to a vibration mode, alarm information, and the like. Due to the arrangement of the main display 32 and the auxiliary display 36, a viewer may view both displays simultaneously.

Figure 4:
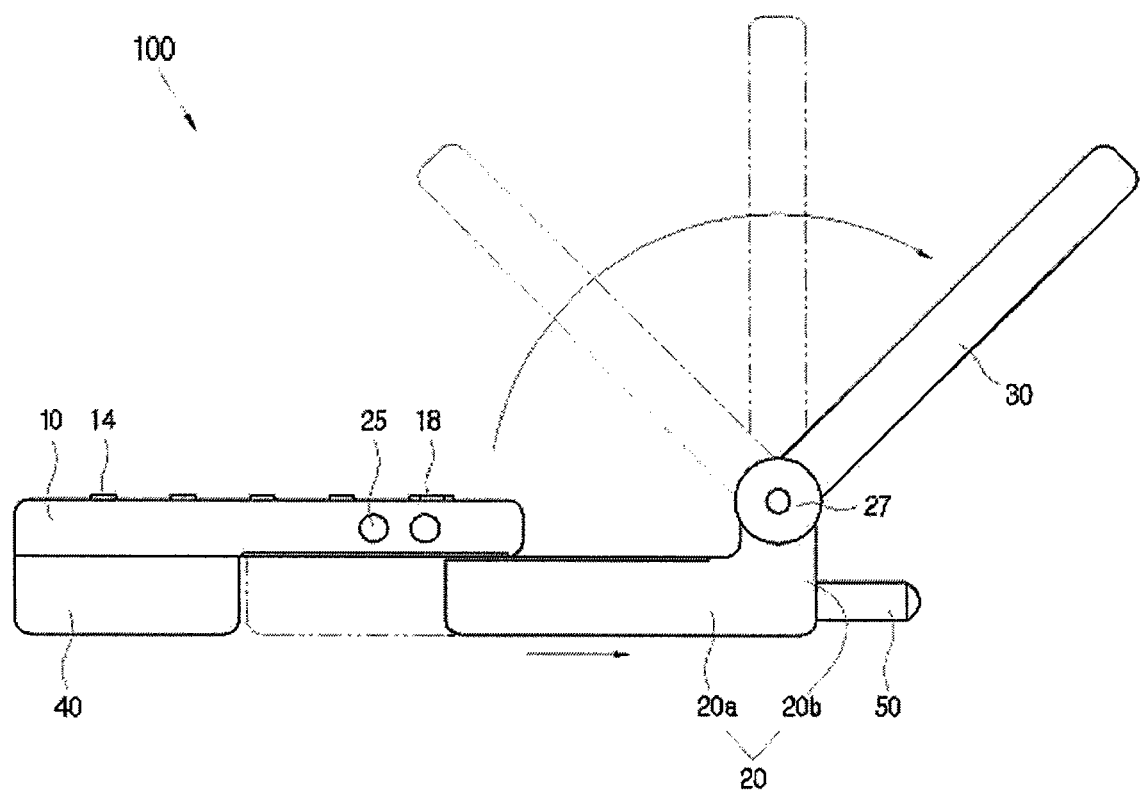
FIG. 4 is a side view showing an operation of the mobile terminal of FIG. 1.

FIG. 4 is a side view showing an operation of the mobile terminal 100 of FIG. 1.

As shown in FIGS. 3 and 4, the hinge module 27 is provided at an end of the vertical part 20b of the slider 20, and the cover 30 rotates about an axis of the hinge module 27.

Figure 5:
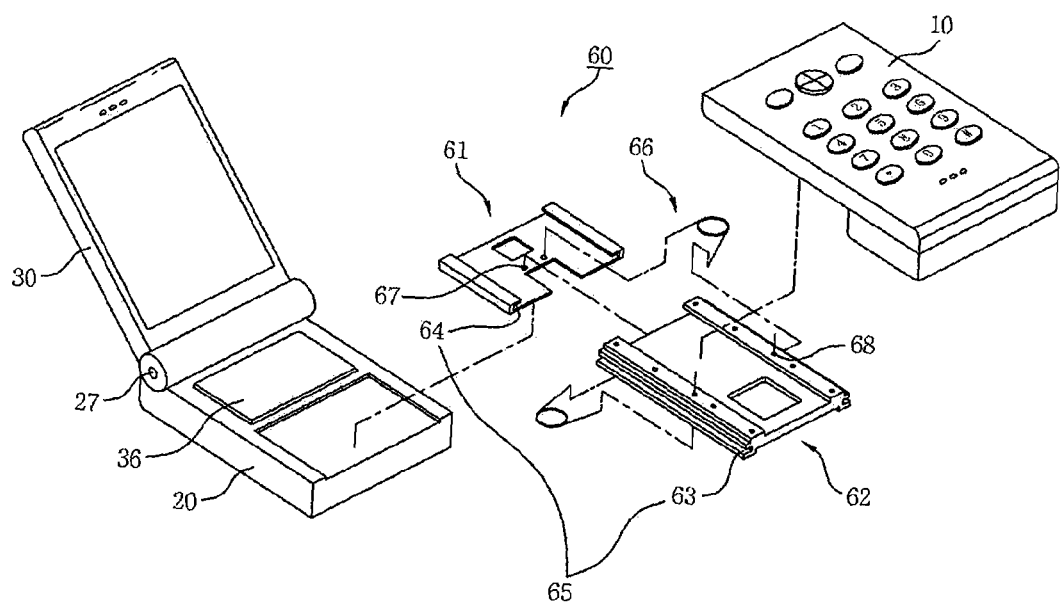
FIG. 5 is an exploded perspective view of an embodiment of the mobile terminal of FIG. 1.

FIG. 5 is an exploded perspective view of an embodiment of the mobile terminal 100 of FIG. 1.

In the embodiment shown in FIG. 5, the mobile terminal 100 includes a sliding movement member 60 which enables the slider 20 to slide with respect to the main body 10.

The sliding movement member 60 includes a main plate 61, a sliding plate 62, and at least one elastic members 66. At least one main fixing hole 67 and a pair of grooves 64 are formed in the main plate 61, and at least one sliding fixing hole 68 and a pair of tracks 63 are formed in the sliding plate 62. The tracks 63 and grooves 64 together make up a guide member 65. The main plate 61 is fixed to the slider 20, and the sliding plate 62 is fixed to the main body 10.

The guide member 65 enables the sliding plate 62 to slide on the main plate 61, thus allowing the slider 20 to slide with respect to the main body 10. Specifically, the tracks 63 of the guide member 65 slide back and forth within the grooves 64. The tracks 63 may have a dove tail structure.

The elastic member(s) 66 exert forces on the slider 20 which urge it towards an open position and towards a closed position with respect to the main body 10. In one embodiment, the elastic member(s) 66 may have an equilibrium position corresponding to a position in which the slider 20 is halfway open with respect to the main body 10. In this embodiment, the elastic member(s) exert forces on the slider 20 which urge it towards the equilibrium position. In this embodiment, the friction between the tracks 63 and grooves 64 counteracts a force of the elastic member(s) 66 allow the slider 20 to be held in a fully open or fully closed position. The elastic member(s) 66 may be implemented, for example, with a torsion spring.

The elastic member(s) 66 are located between the main plate 61 and the sliding plate 62. One end of each elastic member 66 is fixed to a main fixing hole 67, and the other end is fixed to a sliding fixing hole 68.

Figure 6:
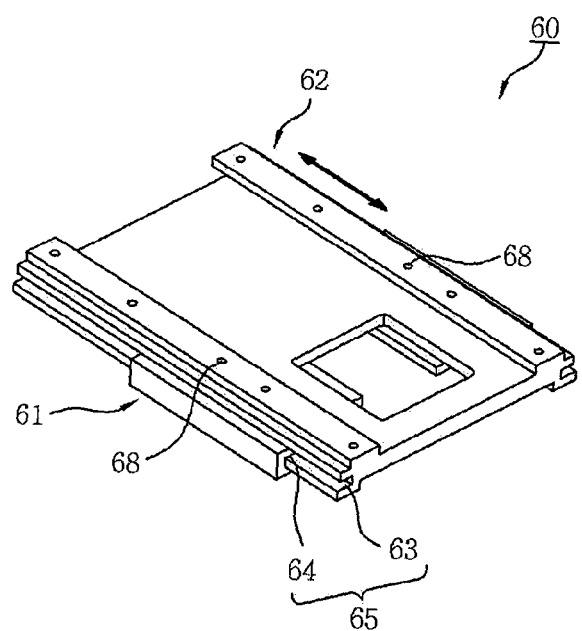
FIG. 6 illustrates an assembly of a main plate and a sliding plate.

FIG. 6 illustrates an assembly of the main plate 61 and the sliding plate 62, in which the tracks 63 are positioned with the grooves 64.

Figure 7:
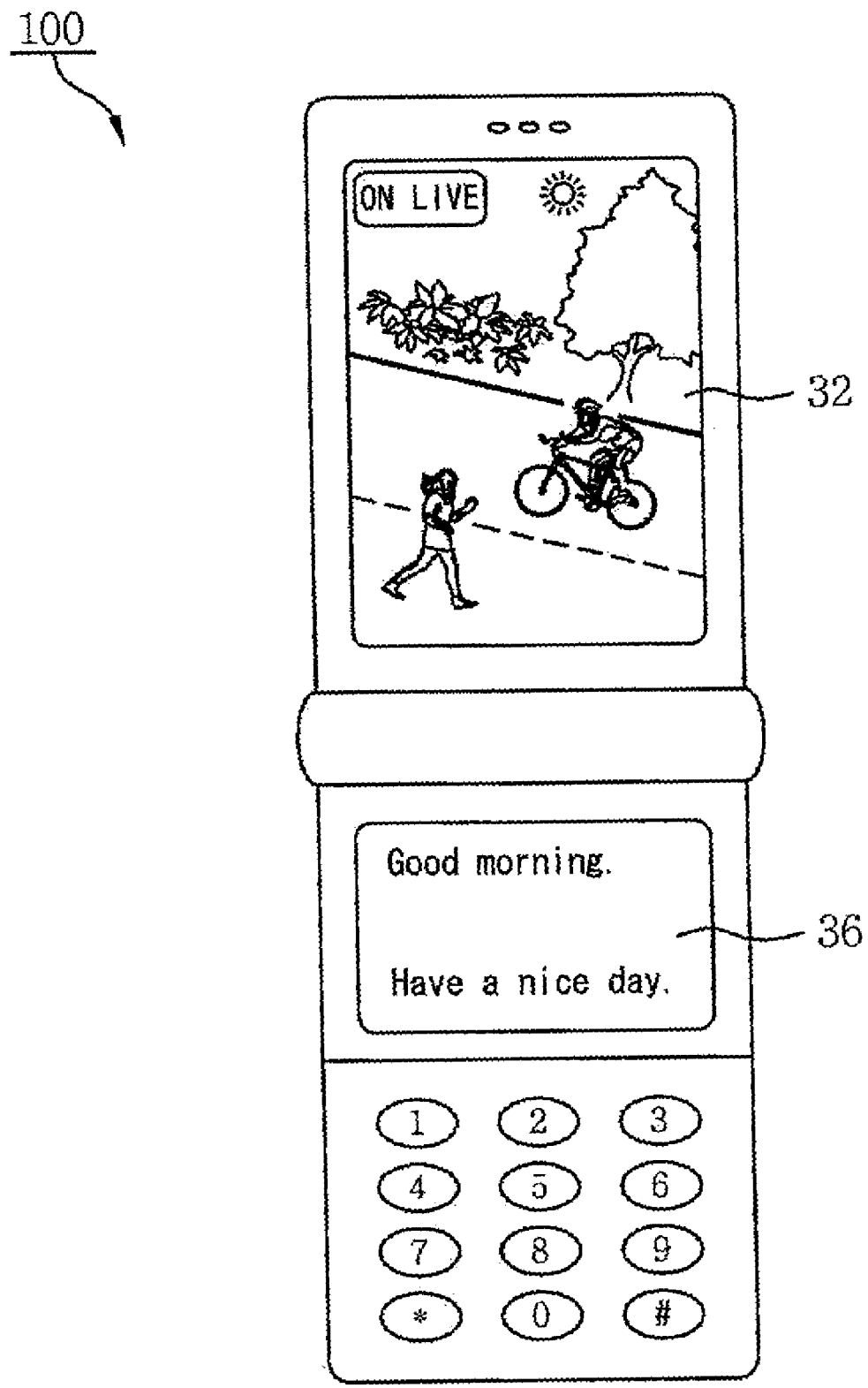
FIG. 7 illustrates an exemplary use of a main display and an auxiliary display of the mobile terminal shown in FIG. 3.

FIG. 7 illustrates an exemplary use of the main display 32 and the auxiliary display 36 of the mobile terminal 100 shown in FIG. 3.

The mobile terminal 100 shown in FIG. 7 displays a video (which may be downloaded, for example, using a DMB service) on the main display 32, and simultaneously displays a received text message on an auxiliary display 36. Thus, in this embodiment, a user can simultaneously view the video while viewing a text message. Of course, this use of the main display 32 and a uxiliary display 36 is merely exemplary, as the displays 32 and 36 may also display other types of information.

Figure 8:
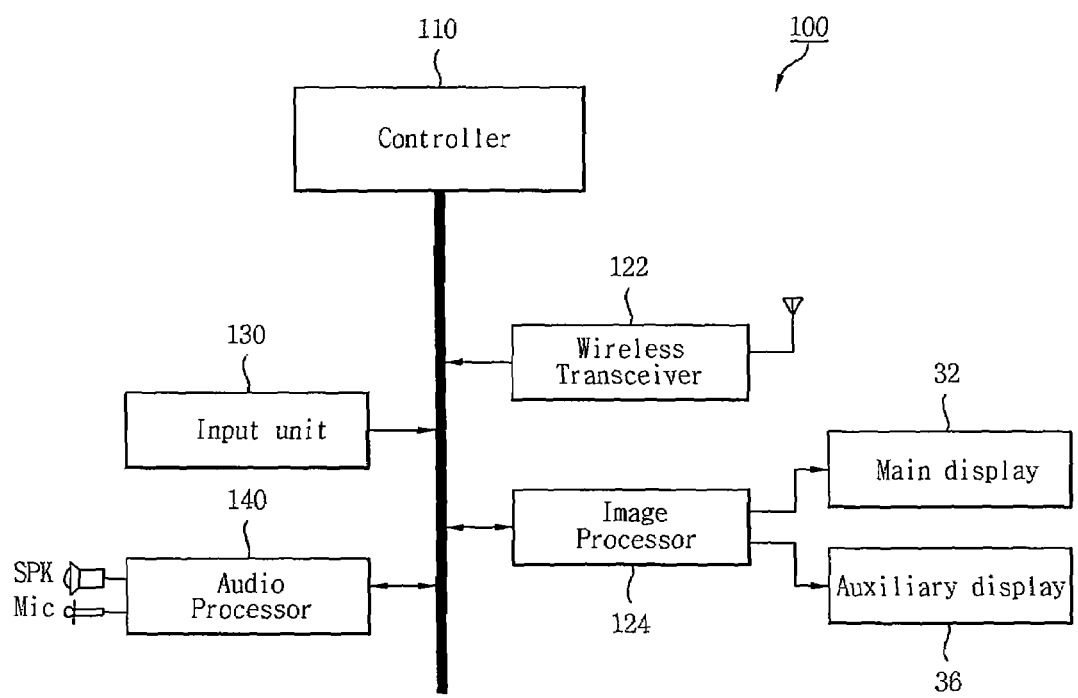
FIG. 8 is a functional block diagram of the mobile terminal of FIG. 1.

FIG. 8 is a functional block diagram of the mobile terminal 100 of FIG. 1.

The mobile terminal 100 shown in FIG. 8 includes a controller 110, a wireless transceiver 122, an image processor 124, an input unit 130, and an audio processor 140.

The controller 100 controls general operations of the mobile terminal 100, and also controls the text and images which are displayed on the main display 32 and auxiliary display 36.

The wireless transceiver 122 transmits and receives wireless signals, and the image processor 124 processes images which are displayed on the displays 32 and 36. In one embodiment, the wireless transceiver 122 may receive broadcast signals containing video signals, which the image processor 124 may process for display on the main display 32 and/or the auxiliary display 36.

The input unit 130 may be one or a combination of various different types of user interfaces, such as, for example, a voice recognition unit, a touch screen or a keypad.

The audio processor 140, which is controlled by the controller 110, processes audio signals received by the wireless transceiver 122, such as, but not limited to, voice signals, and outputs the audio signals through a speaker SPK. The audio processor 140 also processes signals received through a microphone Mic.

Figure 9:
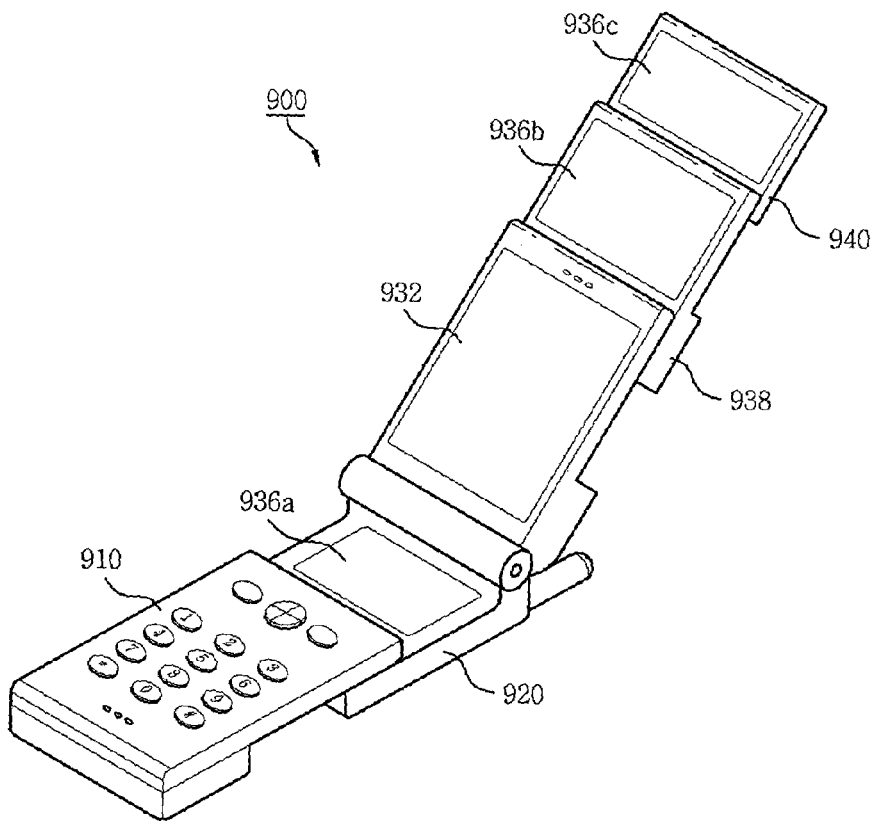
FIG. 9 is a perspective view of a mobile terminal according to another embodiment of the present invention.

FIG. 9 is a perspective view of a mobile terminal 900 according to another embodiment of the present invention.

The mobile terminal 900 shown in FIG. 9 includes a main body 910, a slider 920, a first cover part 930, and at least one other cover part. The slider 920 slides with respect to the main body 910. The mobile terminal 900 also includes a main display 932, a first auxiliary display 936a and at least one other auxiliary display. In the embodiment shown in FIG. 9, the mobile terminal 900 includes a second cover part 938, a third cover part 940, a second auxiliary display 936b and a third auxiliary display 936c.

The main display 932 is formed on an inner surface of the first cover part 930 and the first auxiliary display 936a is formed on an inner surface of the slider 920, in the same way as the main display 32 and auxiliary display 36 of the mobile terminal 100 of FIG. 3 are formed.

The second cover part 938 is slidably mounted to an outer surface of the first cover part 930, and slides open with respect to the first cover part 930. The second auxiliary display 936b is formed on an inner surface of the second cover part 938, and becomes exposed when the second cover part 938 slides open with respect to the first cover part 930. The third cover part 940 is slidably mounted to an outer surface of the second cover part 938, and slides open with respect to the second cover part 938. The third auxiliary display 936c is formed on an inner surface of the third cover part 940, and becomes exposed when the third cover part 940 slides open with respect to the second cover part 938.

Figure 10:
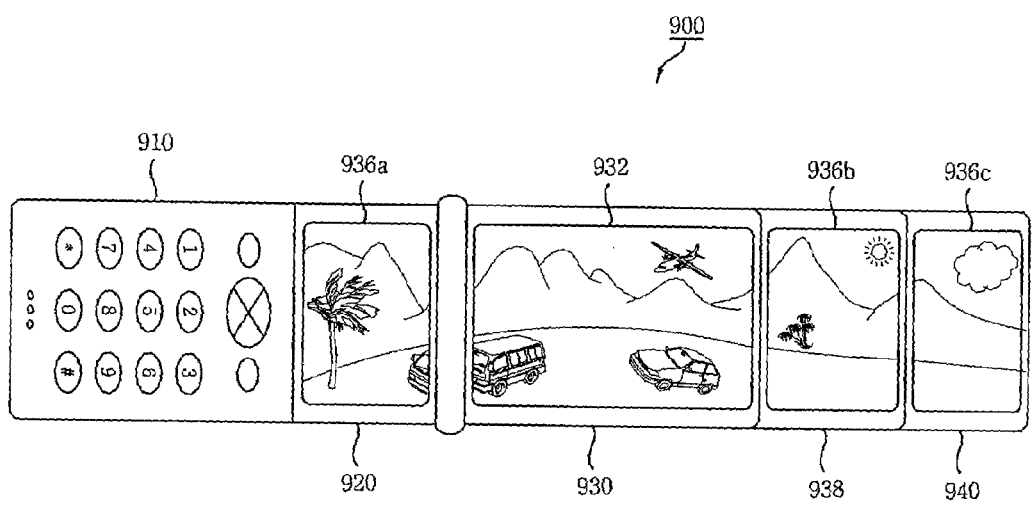
FIG. 10 illustrates an exemplary use of a main display and auxiliary displays of the mobile terminal of FIG. 9.

FIG. 10 illustrates an exemplary use of the main display 930 and the auxiliary displays 936a, 936b, and 936c of the mobile terminal 900 of FIG. 9.

In the embodiment shown in FIG. 10, an image or video is divided into sub-images and displayed on the main display 930 and the auxiliary displays 936a, 936b, and 936c as shown in FIG. 10 to display one composite image or video. As shown in FIG. 10, the composite image or video is displayed on a large display area made up of the main display 930 and the auxiliary displays 936a, 936b, and 936c.

Figure 11:
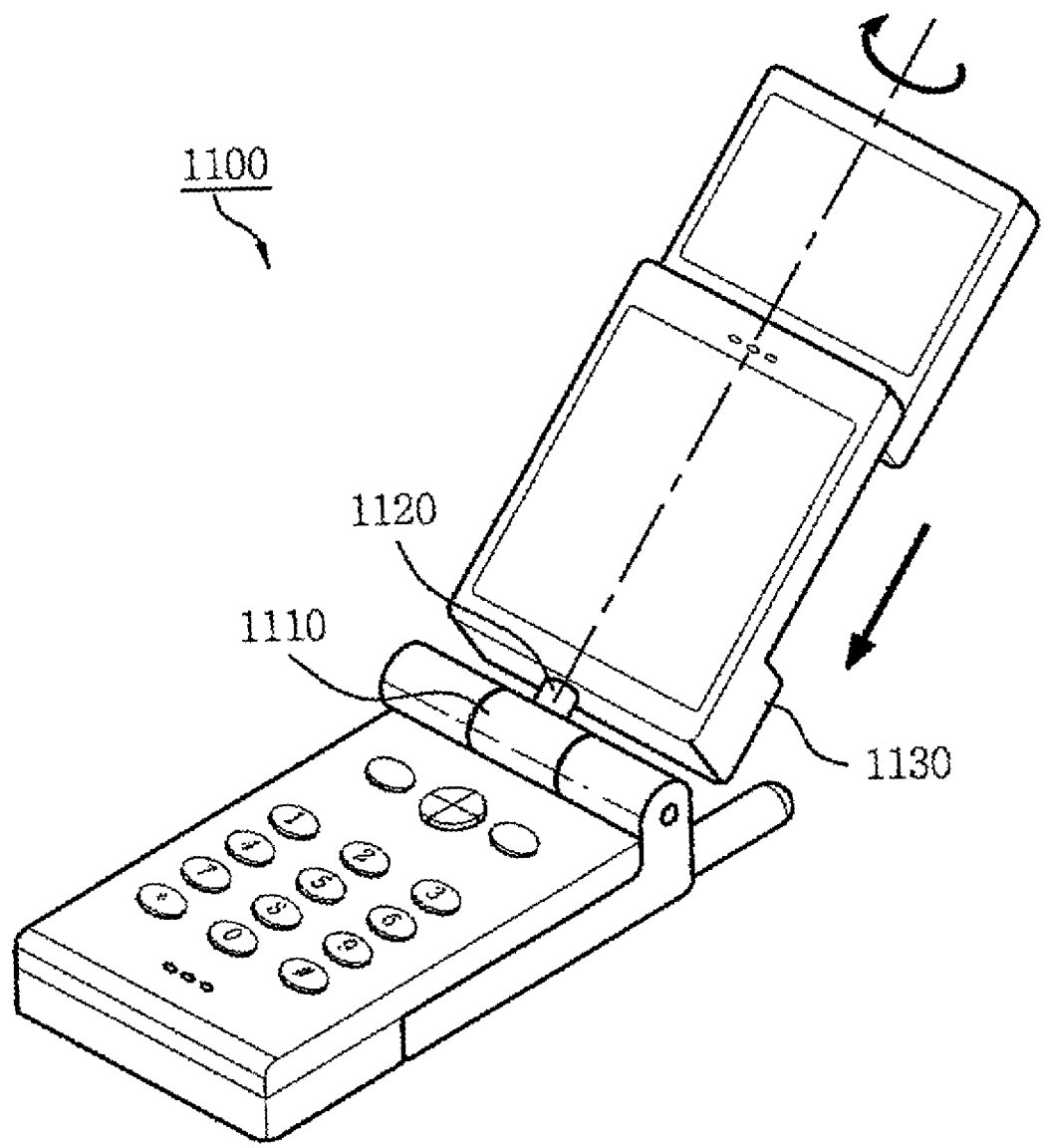
FIG. 11 is a perspective view of a mobile terminal according to another embodiment of the present invention.

FIG. 11 is a perspective view of a mobile terminal 1100 according to another embodiment of the present invention. The mobile terminal 1100 shown in FIG. 11 includes a cover 1130, having a plurality of displays, which rotates about two axes.

The mobile terminal 1100 includes a hinge 1110 having a first axis, around which the cover 1130 rotates. The mobile 1100 also includes an arm 1120 coupled to the hinge 1110, which has a second axis around which the cover 1130 rotates.

The foregoing exemplary embodiments and aspects of the invention are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to an exemplary embodiment, it is understood that the words that have been used are words of description and illustration, rather than words of limitation. As the present invention may be embodied in several forms without departing from the spirit or essential characteristics thereof, it should also be understood that the above-described embodiment is not limited by any of the details of the foregoing description, unless otherwise specified. Rather, the above-described embodiment should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A mobile terminal, comprising:
    a main body;
    a slider slidably mounted to a lower part of the main body;
    a first auxiliary display provided on an inner surface of the slider, the first auxiliary display being exposed only by sliding the slider with respect to the main body;
    a removable battery pack provided on the lower part of the main body, the removable battery pack having a lower surface that is coplanar with a lower surface of the slider;
    a first cover part coupled to the slider with a hinge module;
    a main display provided on an inner surface of the first cover part;
    a second cover part slidably mounted to an outer surface of the first cover part; and
    a second auxiliary display provided on an inner surface of the second cover part, which is exposed by sliding the second cover part with respect to the first cover part in a direction perpendicular to a rotation axis of the hinge module,
    wherein the mobile terminal displays a composite image or video by dividing the composite image or video into a plurality of sub-images and displaying the sub-images on each of the main display, the first auxiliary display, and the second auxiliary display.

2. The mobile terminal according to claim 1, further comprising a third cover part slidably mounted to an outer surface of the second cover part, and a third auxiliary display provided on an inner surface of the third cover part, which is exposed by sliding the third cover part with respect to the second cover part in a direction perpendicular to a rotation axis of the hinge module,
    wherein the mobile terminal displays the composite image or video by displaying one of the sub-images on the third auxiliary display.

* * * * *

UNITED STATES PATENT AND TRADEMARK OFFICE
CERTIFICATE OF CORRECTION

PATENT NO. : 7,620,425 B2 Page 1 of 1
APPLICATION NO. : 11/530231
DATED : November 17, 2009
INVENTOR(S) : Jung Yeon Ju It is certified that error appears in the above-identified patent and that said Letters Patent is hereby corrected as shown below:

On the Title Page, item (73) the Assignee has been incorrectly printed.

"LG Electronics Inc., Seoul (KP)"

should read

--LG Electronics Inc., Seoul (KR)--.

Signed and Sealed this

Twenty-ninth Day of June, 2010

David J. Kappos
*Director of the United States Patent and Trademark Office*